(12) United States Patent
Han (10) Patent No.: US 10,021,258 B2
(45) Date of Patent: Jul. 10, 2018

(54) IMAGE FORMING APPARATUS EQUIPPED WITH DISPLAY DEVICE TO PIVOT IN DIFFERENT DIRECTIONS IN A TILTING OPERATION

(71) Applicant: S-PRINTING SOLUTION CO., LTD., Suwon-si (KR)

(72) Inventor: Sae Hoon Han, Bucheon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/491,167

(22) Filed: Sep. 19, 2014

(65) Prior Publication Data
US 2015/0116742 A1 Apr. 30, 2015

(30) Foreign Application Priority Data
Oct. 29, 2013 (KR) .................. 10-2013-0129598

(51) Int. Cl.
*G06K 15/02* (2006.01)
*G06F 3/0362* (2013.01)
*G06F 3/0481* (2013.01)
*H04N 1/00* (2006.01)

(52) U.S. Cl.
CPC ..... *H04N 1/00519* (2013.01); *H04N 1/00411* (2013.01); *H04N 2201/0089* (2013.01); *H04N 2201/0094* (2013.01)

(58) Field of Classification Search
None
See application file for complete search history.

(56) References Cited

U.S. PATENT DOCUMENTS

| 2005/0185216 | A1* | 8/2005 | Mitsuhashi et al. ......... 358/1.15 |
| 2006/0198094 | A1* | 9/2006 | Kano et al. .................... 361/683 |
| 2007/0147869 | A1* | 6/2007 | Akiyama ........... G03G 15/5016 399/81 |
| 2009/0168112 | A1* | 7/2009 | Muraki .............. H04N 1/00496 358/296 |
| 2011/0055032 | A1* | 3/2011 | Chen ............................... 705/17 |

* cited by examiner

*Primary Examiner* — Haris Sabah
(74) *Attorney, Agent, or Firm* — Staas & Halsey LLP

(57) ABSTRACT

An image forming apparatus may include a pivotable display unit, and a support unit linked to pivoting of the display unit, to support the display unit. Through this configuration, the display unit is tiltable to meet an arrangement state or use state of the image forming apparatus. Since the structure to support the display unit is linked to a tiling operation of the display unit, convenience of use is also provided.

17 Claims, 10 Drawing Sheets

IMAGE FORMING APPARATUS EQUIPPED WITH DISPLAY DEVICE TO PIVOT IN DIFFERENT DIRECTIONS IN A TILTING OPERATION

CROSS-REFERENCE TO RELATED APPLICATIONS

This application claims the benefit of Korean Patent Application No. 10-2013-129598, filed on Oct. 29, 2013 in the Korean Intellectual Property Office, the disclosure of which is incorporated herein by reference.

BACKGROUND

1. Field

Embodiments relate to an image forming apparatus equipped with a display device.

2. Description of the Related Art

Generally, an image forming apparatus forms an image on a printing medium in accordance with an input signal. Examples of such an image forming apparatus include a printer, a copy machine, a facsimile machine, and a complex machine having the functions of the above-mentioned appliances.

Such an image forming apparatus includes a display to input a command to the image forming apparatus or to output information representing an operation state of the image forming apparatus.

The display requires a pivotal structure to vary an orientation angle of the display in accordance with an arrangement state of the image forming apparatus. However, the pivotal structure is bulky and, as such, inferior space utility is exhibited. Furthermore, the thickness of the display is increased due to the pivotal structure. Otherwise, the display should occupy a large space in the interior of the image forming apparatus, for the pivotal structure.

SUMMARY

In an aspect of one or more embodiments, there is provided an image forming apparatus capable of reducing the pivotal space of a display device thereof, thereby achieving an enhancement in space utility.

In an aspect of one or more embodiments, there is provided an image forming apparatus which may include a body, a printing medium supplier to supply a printing medium to an interior of the body, for formation of an image on the printing medium, a printer disposed in the body, to form an image on the supplied printing medium, a discharge unit to discharge the image-formed printing medium outwardly of the body, a display unit provided to be tiltable in a first pivotal direction with respect to the body, and a support unit provided at a back surface of the display unit, to hold the display unit in a predetermined pivotal state, wherein the support unit includes a pivotal member to pivot with respect to the body in a second pivotal direction opposite to the first pivotal direction in linkage with a tilting operation of the display unit, and a sliding member slidable with respect to the pivotal member, to support the back surface of the display unit.

The display unit may include a guide member provided at the back surface of the display unit, to enable the pivotal member to pivot in linkage with the tilting operation of the display unit.

The guide member may include a guide rail to guide a pivotal movement of the pivotal member.

The display unit may have a first position, at which the display unit is arranged in parallel with the body, and a second position, at which the display unit is positioned after pivoting from the first position in the first pivotal direction. The guide rail may have a first guide position, at which the guide rail guides the pivotal member under a condition that the display unit is positioned at the first position, and a second guide position, at which the guide rail guides the pivotal member pivoted in the second pivotal direction under a condition that the display unit is positioned at the second position.

The guide rail may have a curved shape having the first guide position and the second guide position at opposite ends thereof, respectively.

The second guide position may be arranged nearer to a pivotal axis that is a pivot center of the pivotal member than the first guide position.

The pivotal member may include a pivotal protrusion to move along the guide rail.

The support unit may further include an elastic member to press the sliding member in order to enable the sliding member to support the back surface of the display unit while sliding with respect to the pivotal member.

The display unit may include a plurality of engagement portions arranged in parallel with the back surface of the display unit, to be supported by the support unit.

The plurality of engagement portions may include a first engagement portion arranged near a pivot center of the display unit in the first pivotal direction, and a second engagement portion arranged at a position farther from the pivot center of the display unit than the first engagement portion. The sliding member may vary a support position thereof from the first engagement portion to the second engagement when the display unit pivots in the first pivotal direction.

The plurality of engagement portions may include a plurality of valleys and a plurality of mountains each formed between adjacent ones of the valleys.

The display unit may further include a pivot guide provided at one side of the display unit, to prevent the display unit from interfering with the body during a tilting operation of the display unit in the first pivotal direction. The pivot guide may include a pivot guide rail formed to be spaced apart from the pivot center in the first pivotal direction by a predetermined distance, and to be restrained by a pivot guide lug provided at the body.

In an aspect of one or more embodiments, there is provided an image forming apparatus which may include a body, a printing medium supplier to supply a printing medium to an interior of the body, a printer to form an image on the supplied printing medium, and a discharge unit to discharge the image-formed printing medium outwardly of the body further includes a display unit disposed at one side of the body, a first hinge unit provided at one side of the display unit, to enable the display unit to pivot in a first pivotal direction with respect to the body, and a second hinge unit to pivot in a second pivotal direction opposite to the first pivotal direction in linkage with an operation of the display unit, the second hinge unit having a variable support position to support a back surface of the display unit during pivoting of the display unit in the first pivotal direction.

The second hinge unit may include a pivotal member pivotally coupled to the body, to pivot in the second pivotal direction during pivoting of the display unit in the first pivotal direction, a sliding member slidable with respect to the pivotal member, to support the back surface of the display unit, and an elastic member to provide an elastic force to slide the sliding member.

The second hinge unit may further include a guide member provided at the back surface of the display unit, to guide pivoting of the pivotal member. The guide member may include a guide rail to guide the pivotal member such that the pivotal member pivots in the second pivotal direction when the display unit pivots in the first pivotal direction.

The guide rail may have a curved shape inclined in a direction opposite to the first pivotal direction while extending in a longitudinal direction of the display unit from a pivot center of the display unit.

The pivotal member may include a pivotal protrusion movable along the guide rail while being restrained by the guide rail.

The display unit may have a first position, at which the display unit is arranged in parallel with the body, and a second position, at which the display unit is positioned after pivoting from the first position in the first pivotal direction. The guide rail may have a first guide position, at which the pivotal protrusion is positioned under a condition that the display unit is positioned at the first position, and a second guide position, at which the pivotal protrusion is positioned under a condition that the display unit is positioned at the second position. The guide rail may have a curved shape having the first guide position and the second guide position at opposite ends thereof, respectively.

The sliding member of the second hinge unit may be pressed by the elastic member, to support the back surface of the display unit at the variable support position.

In an aspect of one or more embodiments, there is provided an image forming apparatus which may include a body, a display unit disposed at one side of the body, a first hinge unit provided at one side of the display unit, to enable the display unit to tilt with respect to the body, and a second hinge unit to support a back surface of the display unit such that the display unit is maintained at a predetermined tilting angle, wherein the first hinge unit and the second hinge unit are linked to a tilting operation of the display unit.

In an aspect of one or more embodiments, there is provided an image forming apparatus which may include a body; a display unit which is tiltable in a first pivotal direction; and a support unit provided at a back surface of the display unit, to hold the display unit in a predetermined pivotal state, wherein the support unit comprises a pivotal member to pivot toward and away from the body in a second pivotal direction opposite to the first pivotal direction in linkage with a tilting operation of the display unit, and a sliding member slidable to and from the pivotal member, to support the back surface of the display unit.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Hereinafter, embodiments will be described in detail with reference to the accompanying drawings.

Figure 1:
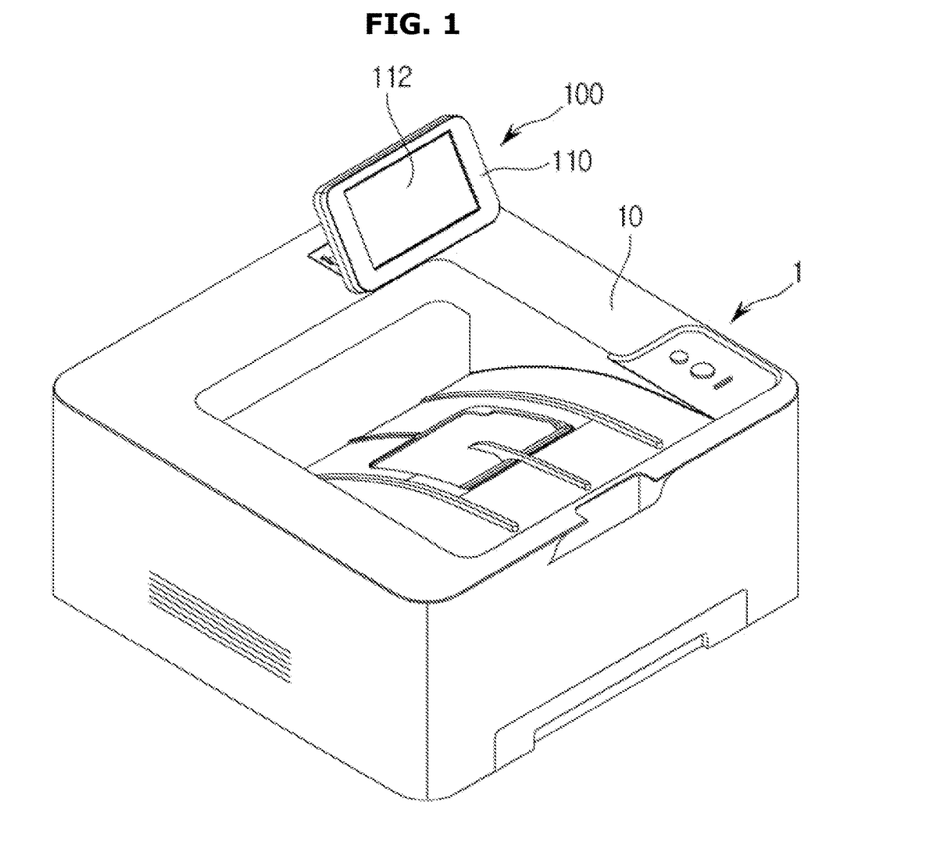
FIG. 1 is a perspective view illustrating an image forming apparatus according to an embodiment.
Figure 2:
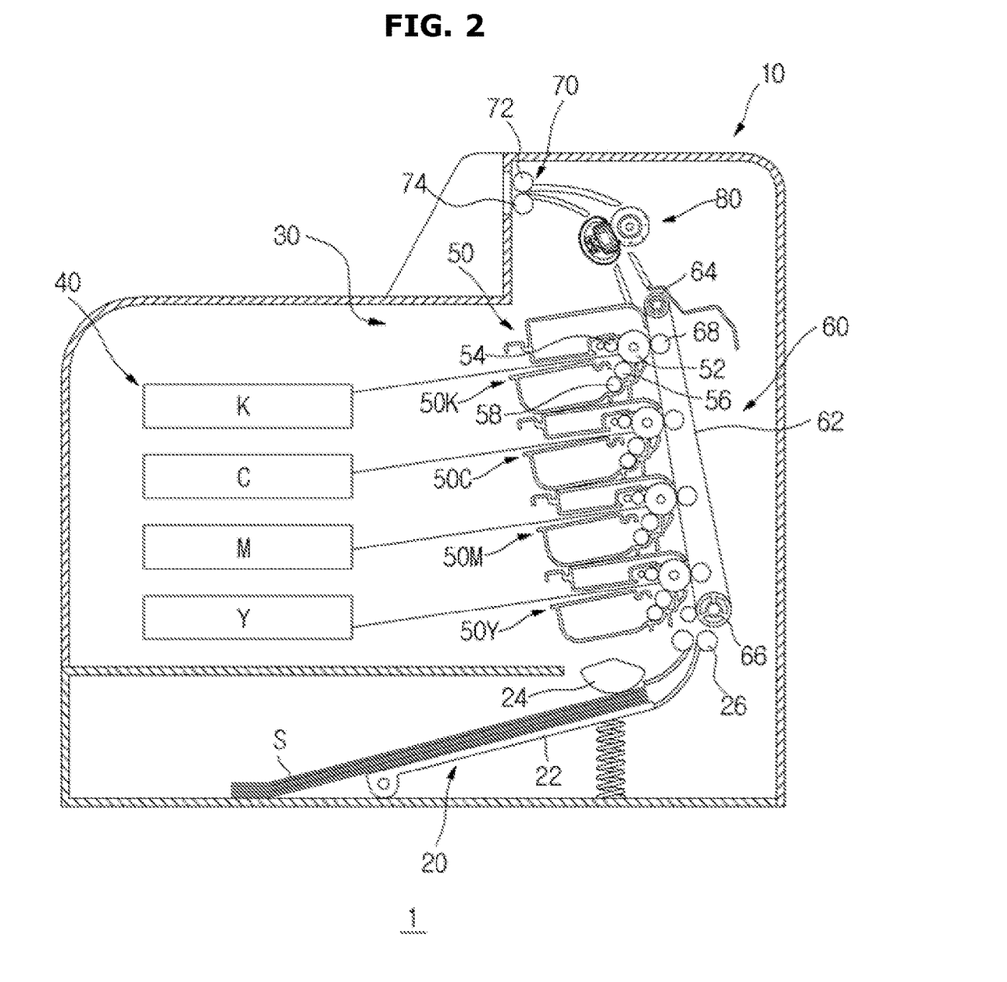
FIG. 2 is a sectional view illustrating the image forming apparatus according to an embodiment.

FIG. 1 is a perspective view illustrating an image forming apparatus according to an embodiment. FIG. 2 is a sectional view illustrating the image forming apparatus according to an embodiment.

As illustrated in FIG. 1, the image forming apparatus, which is designated by reference numeral "1", includes a body 10, a printing medium supplier 20, a printer 30, a fusing unit 80, and a printing medium discharge unit 70.

The body 10 defines an appearance of the image forming apparatus 1 while supporting various elements installed in the image forming apparatus 1. The body 10 includes a cover (not shown) provided to open or close a portion of the body 10, and a body frame (not shown) to support or fix various elements within the body 10.

The printing medium supplier 20 supplies a printing medium S to the printer 30. The printing medium supplier 20 includes a tray 22, on which printing mediums S are stacked, and a pickup roller 24 to pick up the printing mediums S stacked on the tray 22 one by one. The printing medium S picked up by the pickup roller 24 is fed to the printer 30 by feeding rollers 26.

The printer 30 may include a light scanner 40, a developing device 50, and a transfer unit 60.

The light scanner 40 includes an optical system (not shown) in order to scan light corresponding to image information of yellow (Y), magenta (M), cyan (C), and black (K) onto the developing device 50 in accordance with a printing signal.

The developing device 50 forms a toner image in accordance with image information input from an external appliance such as a computer. The image forming apparatus 1 according to this embodiment is a color image forming apparatus and, as such, is constituted by four developing units 50Y, 50M, 50C, and 50K, which receive toners of different colors, for example, yellow (Y), magenta (M), cyan (C), and black (K).

Each of the developing units 50Y, 50M, 50C, and 50K may include a photosensitive body 52, on which a latent image is formed by the light scanner 40, a charging roller 54 to charge the photosensitive body 52, a developing roller 56 to supply a toner image to the latent image formed on the photosensitive body 52, and a supply roller 58 to supply a toner to the developing roller 56.

The transfer unit 60 transfers the toner image formed on the photosensitive body 52 in each of the developing units 50Y, 50M, 50C and 50K to a printing medium. The transfer unit 60 may include a transfer belt 62 to travel in a circulating manner while contacting the photosensitive bodies 52 of the developing units 50Y, 50M, 50C and 50K, a transfer belt driving roller 64 to drive the transfer belt 62, a tension roller 66 maintaining the transfer belt 62, and four transfer rollers 68 to transfer toner images developed on respective photosensitive bodies 52 to the printing medium.

The printing medium is fed at the same speed as the travel speed of the transfer belt 62 while being attached to the transfer belt 62. In an embodiment, a voltage having a polarity opposite to that of the toner attached to each photosensitive body 52 is applied to each transfer roller 68. As a result, the toner image on each photosensitive body 52 is transferred to the printing medium.

The fusing unit 80 fuses the resultant toner image transferred to the printing medium by the transfer unit 60.

The printing medium discharge unit 70 discharges the printing medium outwardly of the body 10. The printing medium discharge unit 70 includes a discharge roller 72, and a pinch roller 74 installed to face the discharge roller 72.

A display device 100 is provided at one side of the body 10. The display device 100 is adapted to input a command to the image forming apparatus 1 or to output information representing an operation state of the image forming apparatus 1. This will be described in more detail later.

Figure 3:
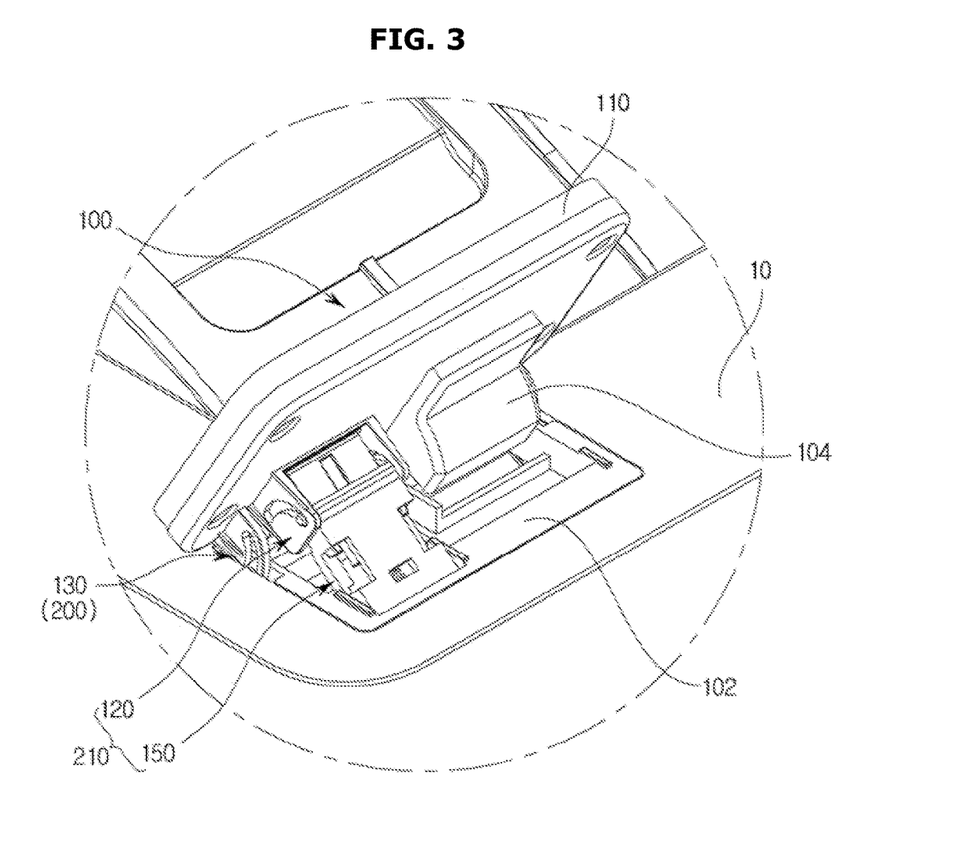
FIG. 3 is a perspective view of a display device according to an embodiment.

FIG. 3 is a perspective view of a display device according to an embodiment.

Referring to FIG. 3, the image forming apparatus 1 includes the display device, which is designated by reference numeral "100". The display device 100 may be installed on the body 10 of the image forming apparatus 1. The display device 100 may be seated on a seat 102 provided at the body 10.

The display device 100 includes a display unit 110 and a support unit 150.

The display unit 110 may output results generated in association with operation of the image forming apparatus 1 or may input commands associated with operation of the image forming apparatus 1. The display unit 110 may include a display panel 112.

The display unit 110 may include a pivotal structure to enable the display unit 110 to tilt with respect to the body 10.

The display unit 110 may include a guide member 120 provided at a back surface of the display unit 110, to link operation of the support unit 150 to a tilting operation of the display unit 110.

The support unit 150 is adapted to support the display unit 110 with respect to the body 10. In detail, when the display unit 110 is tilted with respect to the body 10, the support unit 150 adjusts the tilting angle, and holds the display unit 110 at the adjusted tilting angle.

The support unit 150 may be provided at the back surface of the display unit 110, to maintain a pivoting state of the display unit 110. When the display unit 110 satisfies a predetermined pivoting state, the support unit 150 supports the back surface of the display unit 110 in order to maintain the satisfied pivoting state.

The display unit 110 may further include a wire guide 104 provided at the back surface of the display unit 110, to guide a wire (not shown) provided for transmission and reception of electrical signals and supply of electric power.

Figure 4:
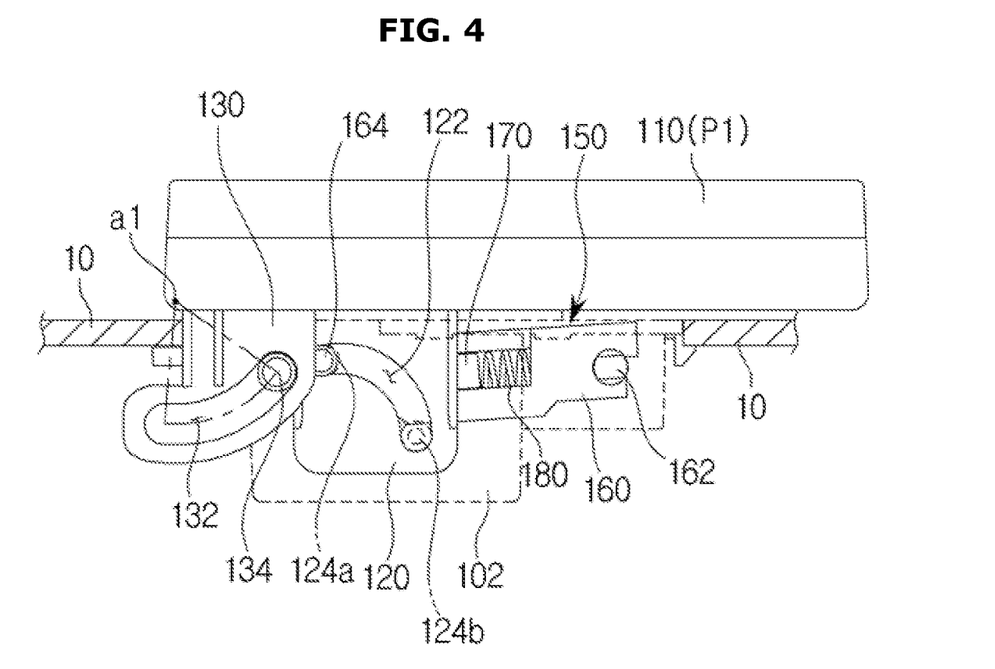
FIGS. 4 and 5 are views illustrating operation of the display device according to an embodiment.
Figure 5:
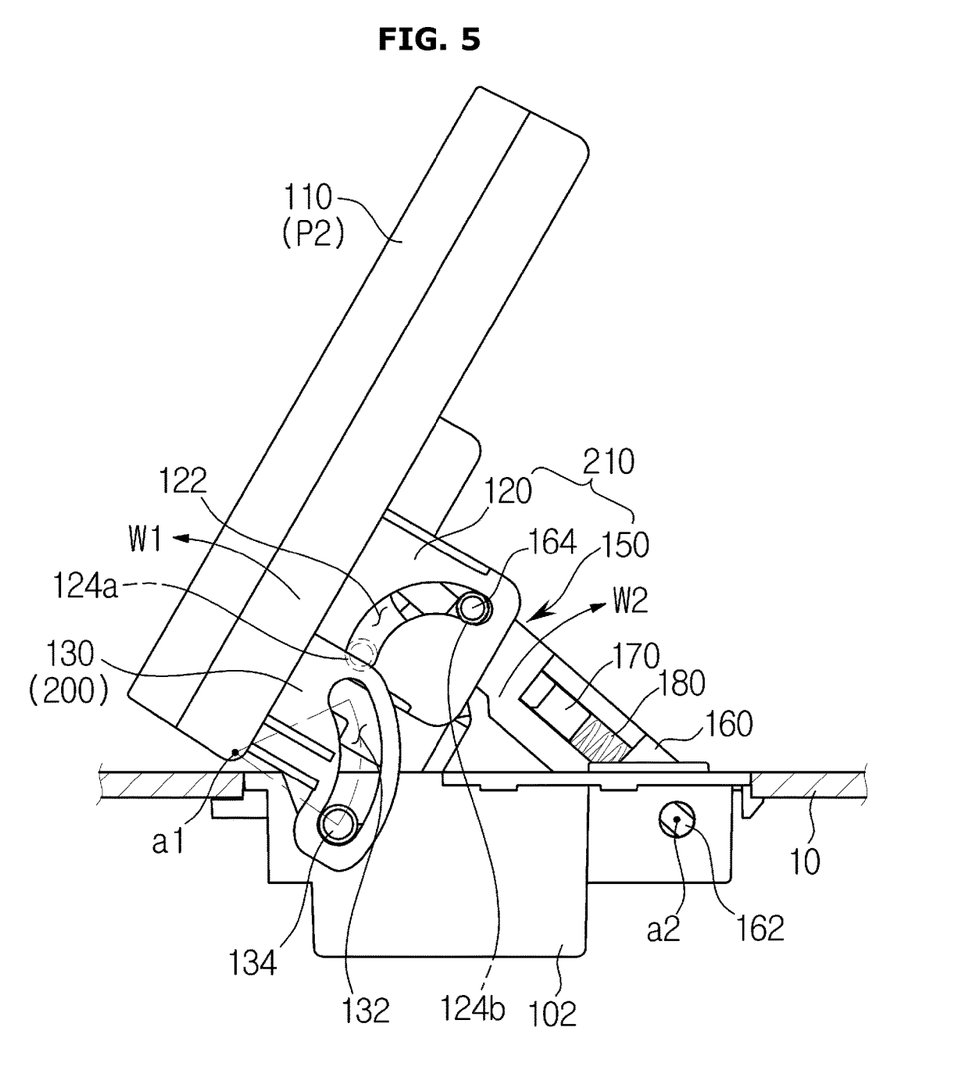
Figure 6:
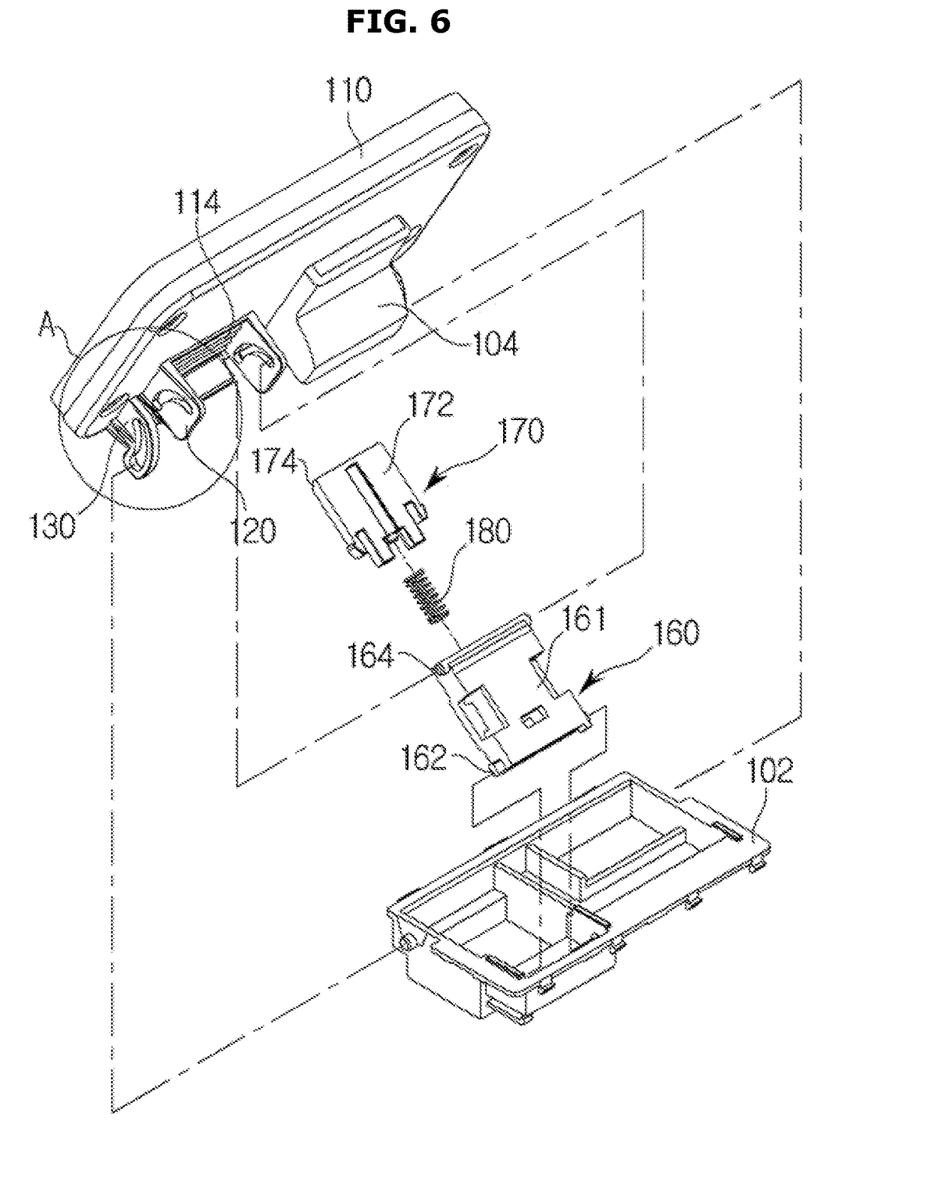
FIG. 6 is an exploded perspective view of the display device according to an embodiment.
Figure 7:
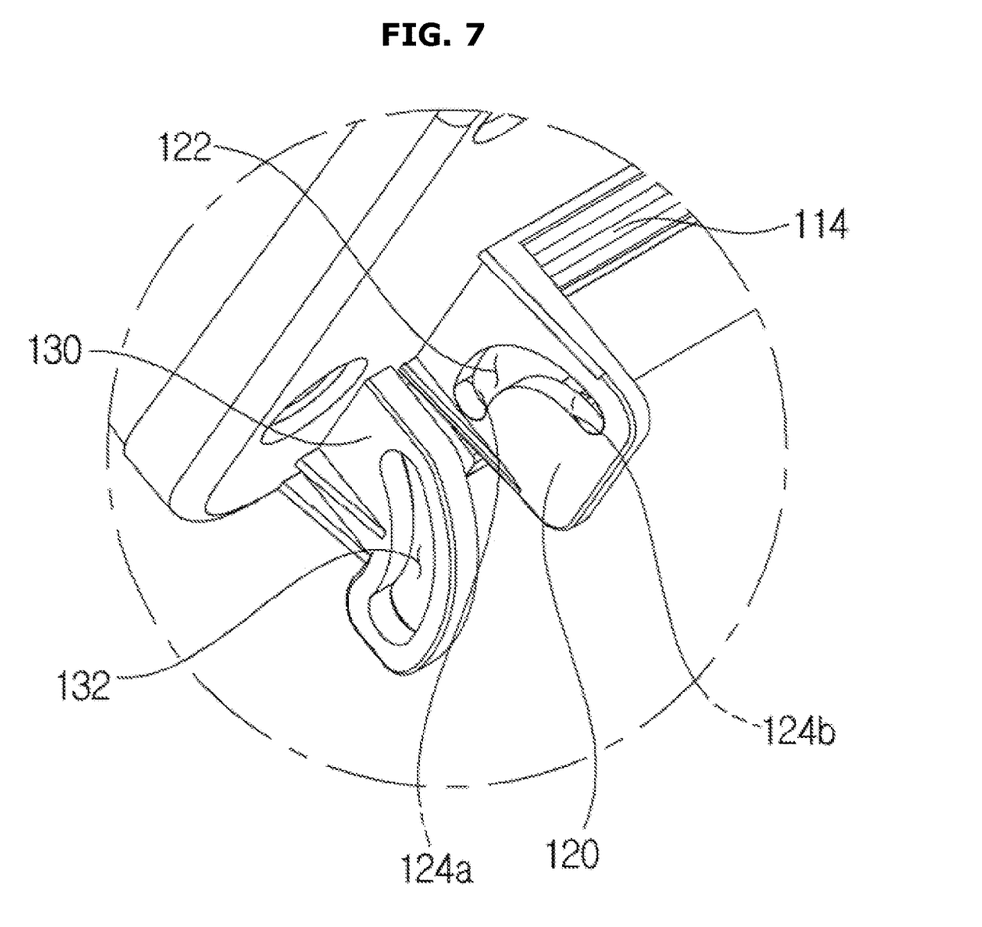
FIG. 7 is an enlarged view corresponding to a portion A of FIG. 6.

FIGS. 4 and 5 are views illustrating operation of the display device according to an embodiment. FIG. 6 is an exploded perspective view of the display device according to an embodiment. FIG. 7 is an enlarged view corresponding to a portion A of FIG. 6.

The support unit 150 operates in linkage with the display unit 110, to support a tilting operation of the display unit 110.

The support unit 150 may include a pivotal member 160 and a sliding member 170.

The pivotal member 160 pivots in linkage with a tilting operation of the display unit 110. When it is assumed that the tilting direction of the display unit 110 with respect to the body 10 corresponds to a first pivotal direction W1, the pivotal member 160 is arranged to pivot in a second pivotal direction W2 opposite to the first pivotal direction W1 with respect to the body 10. Conversely, when the display unit 110 pivots in the second pivotal direction W2, to return to an original position, namely, a laid position, the pivotal member 160 pivots in the first pivotal direction+W1.

The pivotal member 160 may include a pivotal member body 161, and a pivotal protrusion 164 extending from the pivotal member body 161. The pivotal member 160 may further include a pivotal lug 162 to enable the pivotal member 160 to pivot in the second pivotal direction W2 with respect to the body 10. The pivotal lug 162 may pivot about a second pivot axis a2 spaced apart from a pivot center of the display unit 110, namely, a first pivot axis a1.

As described above, the guide member 120 included in the display unit 110 may be provided at the back surface of the display unit 110 in order to pivot the pivotal member 160 in linkage with a pivotal operation of the display unit 110.

In an embodiment, the guide member 120 may include a pair of guide members provided at the back surface of the display unit 110, to guide the pivotal member 160 at opposite sides of the pivotal member 160.

The guide member 120 may include a guide rail 122 to guide operation of the pivotal member 160. The pivotal protrusion 164 provided at the pivotal member 160 is arranged to move along the guide rail 122 and, as such, operation of the pivotal member 160 is linked with operation of the display unit 110.

That is, the pivotal protrusion 164 is restrained by the guide rail 122, to move along the guide rail 122, and, as such, the pivotal member 160 operates in linkage with operation of the display unit 110.

In the following description, a position of the display unit 110, at which the display unit 110 is positioned in parallel with the body 10, is referred to as a "first position P1", and a position of the display unit 110 maintained after the display unit 110 pivots from the first position P1 in the first pivotal direction W1 is referred to as a "second position P2". In an embodiment, the guide rail 122 may have a first guide position 124a, at which the guide rail 122 guides the pivotal member 160 under the condition that the display unit 110 is positioned at the first position P1, and a second guide position 124b, at which the guide rail 122 guides the pivotal member 160 pivoted in the second pivotal direction W2 under the condition that the display unit 110 is positioned at the second position P2.

The guide rail 122, which has the first and second guide positions 124a and 124b, may have a curved shape having the first and second guide positions 124a and 124b at opposite ends thereof. In other words, the guide rail 122 may have a curved shape inclined in a direction opposite to the first pivotal direction W1 while extending in a longitudinal direction of the display unit 110 from a position near the pivot center of the display unit 110.

The second guide position 124b is arranged nearer to a pivotal axis that is a pivot center of the pivotal member 160 than the first guide position 124a. Accordingly, even when the display unit 110 is spaced away from the pivotal axis in accordance with pivotal movement thereof from the first position P1 to the second position P2 in the first pivotal direction W1, the pivotal protrusion 164 of the pivotal member 160 is still positioned within the guide rail 122 without being separated from the guide rail 122.

Figure 8:
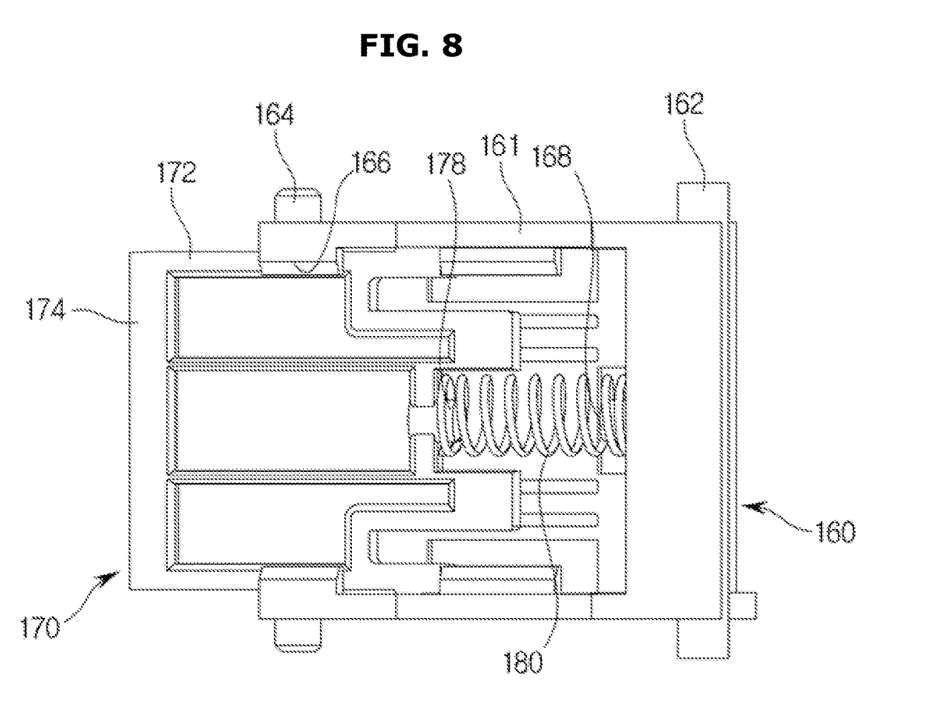
FIG. 8 is a bottom view of the support unit according to an embodiment.
Figure 9:
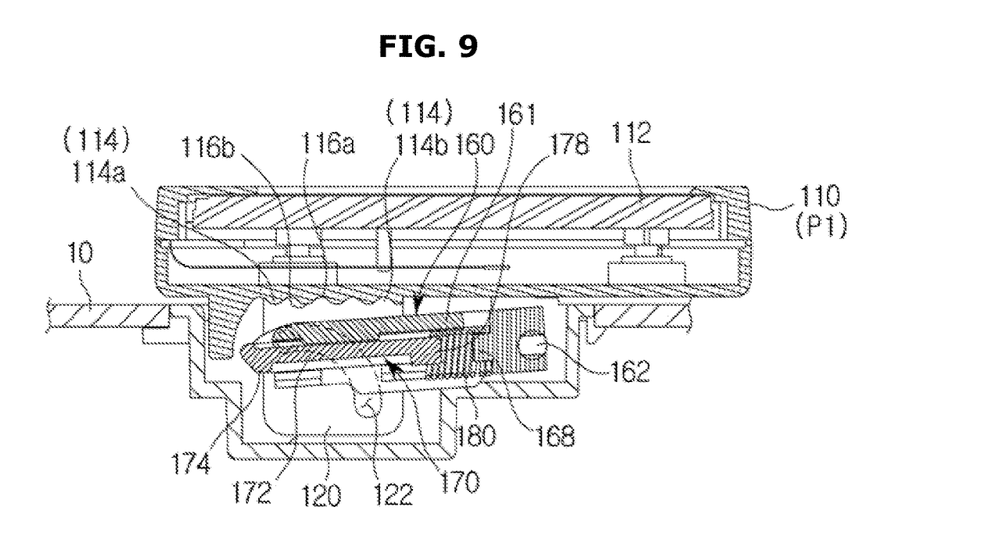
FIGS. 9 and 10 are sectional views illustrating operation of the display device according to an embodiment.
Figure 10:
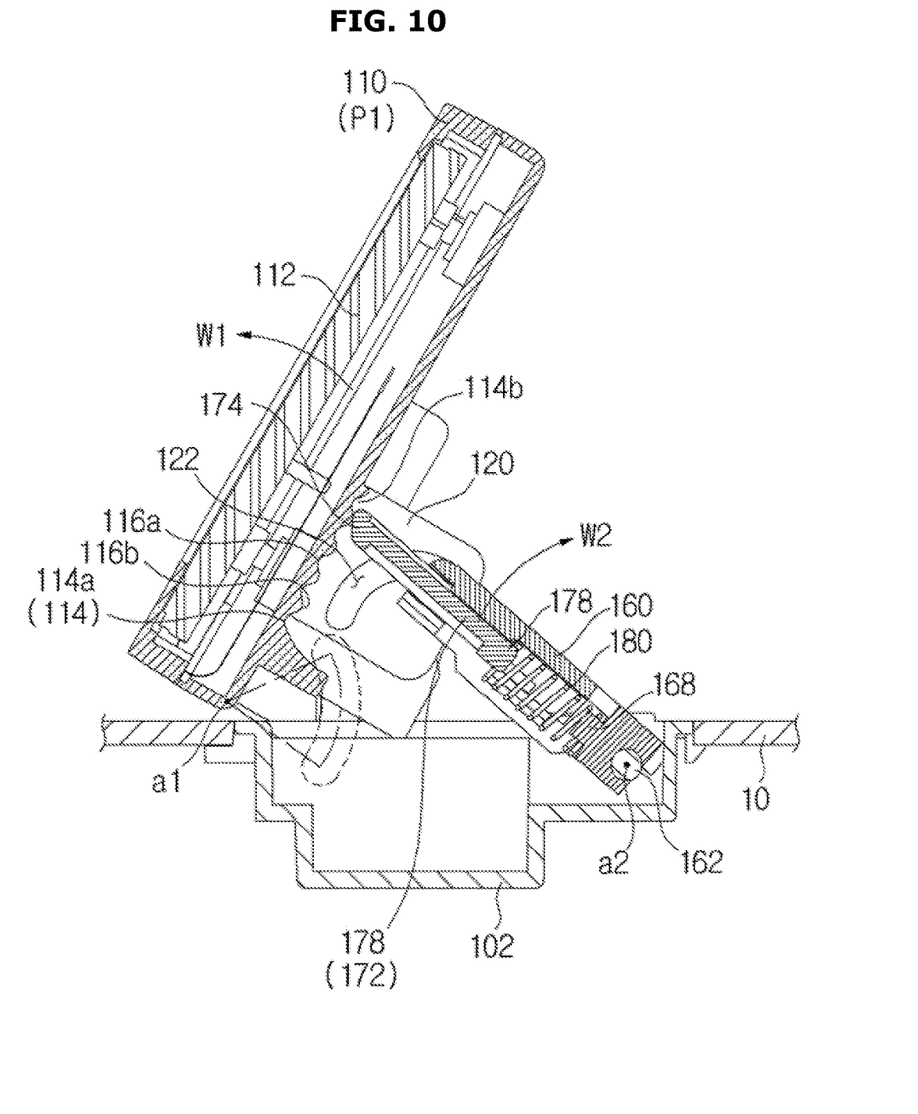

FIG. 8 is a bottom view of the support unit according to the illustrated embodiment. FIGS. 9 and 10 are sectional views illustrating operation of the display device according to an embodiment.

The sliding member 170 slides from the pivotal member 160, to support the back surface of the display unit 110. The sliding member 170 may include a sliding member body 172, and an engagement member 174 provided at one end of the sliding member body 172 while having a greater thickness than the sliding member body 172. The engagement member 174 may be selectively engaged with one of a plurality of engagement portions 114 provided at the display unit 110, which will be described later.

The pivotal member 160 may include a separation prevention guide 166 to prevent the sliding member 170 from being separated from the pivotal member 160 during sliding thereof. In an embodiment, the sliding member 170 is disposed at an inside of the pivotal member 160, to be slidable on a lower surface of the pivotal member 160. In an embodiment, the separation prevention guide 166 has a bent shape, to enclose portions of side and lower surfaces of the sliding member 170.

The support unit 150 may further include an elastic member 180 slidable with respect to the pivotal member 160, to elastically press the sliding member 170 against the back surface of the display unit 110. The elastic member 180 contacts the pivotal member 160 at one end thereof while contacting the sliding member 170 at the other end thereof. In detail, in order to fix the elastic member 180, the pivotal member 160 is provided with a first fixing portion (first fixing member) 168, and the sliding member 170 is provided with a second fixing member (second fixing portion) 178. Thus, both ends of the elastic member 180 are fixed.

Since the elastic member 180 is fixed, at both ends thereof, to the first and second fixing portions 168 and 178, respectively, the sliding member 170 is pressed by the elastic member 180 and, as such, slides with respect to the pivotal member 160.

When the pivotal member 160 pivots in linkage with a tilting operation of the display unit 110 in accordance with the above-described configuration, the sliding movement length of the sliding member 170 may be set to be varied in accordance with variation in the distance between an end of the pivotal member 160 and the back surface of the display unit 110. Thus, it may be possible to vary the sliding movement length and pivotal angle of the support unit 150 in accordance with a tilting angle of the display unit 110.

The display unit 110 may further include the plurality of engagement portions 114, which are provided at the back surface of the display unit 110, to enable the display unit 110 to be supported by the support unit 150.

The engagement member 174 of the sliding member 170 is engaged with one of the engagement portions 114 and, as such, the support unit 150 supports the display unit 110. The plurality of engagement portions 114 may include a first engagement portion 114a arranged near the pivot center of the display unit 110 in the first pivotal direction W1, and a second engagement portion 114b arranged at a position farther from the pivot center of the display unit 110 than the first engagement portion 114a. The sliding member 170 may be arranged to vary a support position thereof from the first engagement portion 114a to the second engagement portion 114b when the display unit 110 pivots in the first pivotal direction W1.

The plurality of engagement portions 114 may be formed by a plurality of valleys 116a, and a plurality of mountains 116b each formed between adjacent ones of the valleys 116a. In accordance with repeated formation of the valleys 116a and mountains 116b, engagement grooves 117 are formed. The engagement member 174 may be seated in one of the engagement grooves 117.

The display unit 110 may further include a pivot guide 130 provided at one side of the display unit 110, to prevent the display unit 110 from interfering with the body 10 during a tilting operation of the display unit 110 in the first pivotal direction W1. Since the pivot guide 130 is provided to prevent the display unit 110 from interfering with the body 10 during a tilting operation of the display unit 110, it is unnecessary to provide a space required for a tilting operation of the display unit 110 and, as such, an improvement in space utility may be achieved.

The pivot guide 130 may include a pivot guide rail 132 formed to be spaced apart from the pivot center in the first pivotal direction W1, namely, the first pivot axis a1, by a predetermined distance, and a pivot guide lug 134 provided at the body 10, to restrain the pivot guide rail 132. As the pivot guide rail 132 is restrained by the pivot guide lug 134, it may be possible to prevent separation of the display unit 110 during a tilting operation of the display unit 110, and to prevent the end of the display unit 110 near the pivot center of the display unit 110 from interfering with the body 10. Although the pivot guide 130 is not limited in number, a pair of pivot guides 130 is provided to support opposite sides of the display unit 110 in an embodiment.

A hinge structure for the display unit 110 may be directly provided at the body 10, to allow the display unit 110 to pivot with respect to the body 10. In the illustrated embodiment, however, the pivot guide 130 is provided to arrange the pivot center of the display unit 110 outside the display unit 110. In an embodiment, it may be possible to achieve an improvement in aesthetics.

In an embodiment, the display device 110 may include a first hinge unit 200 and a second hinge unit 210.

In an embodiment, the first hinge unit 200 includes the pivot guide 130, and the second hinge unit 210 includes the guide member 120 and the support unit 150. No description will be given of the same configuration as that of the above-described embodiment.

Hereinafter, operation of the image forming apparatus having the above-described configuration will be described.

The display device 100 is arranged to tilt at one side of the body 10.

When the display unit 110 of the display device 100 tilts in the first pivotal direction W1, the pivotal member 160 of the support unit 150 pivots in the second pivotal direction W2 in linkage with the pivotal operation of the display unit 110. In detail, the pivotal protrusion 164 of the pivotal member 160 moves along the guide rail 122 of the guide member 120 provided at the back surface of the display unit 110 and, as such, a pivotal operation of the pivotal member 160 pivots in the second pivotal direction W2.

At the same time, the sliding member 170 slides with respect to the pivotal member 160 by the elastic member 180 and, as such, is engaged with one of the engagement portions 114 provided at the back surface of the display unit 110, to support the display unit 110.

The display unit 110 pivots without interfering with the body 10 at the end thereof during a pivotal movement thereof in the first pivotal direction W1, by virtue of the pivot guide 130.

That is, when the display unit 110 tilts, the pivotal movement thereof in the first pivotal direction W1 is guided by the pivot guide 130, and the guide member 120 and support unit 150 support the back surface of the display unit 110 at a predetermined tilting angle and, as such, the predetermined tilting angle is maintained.

Conversely, when the display unit 110 is moved to a laid position, that is, when the display unit 110 pivots in the second pivotal direction W2, the pivotal member of the support unit 150 pivots in the first pivotal direction W1 in linkage with the pivotal operation of the display unit 110. In detail, the pivotal protrusion 164 moves along the guide rail 122 of the guide member 120 provided at the back surface of the display unit 110 and, as such, a pivotal operation of the pivotal member 160 in the first pivotal direction W1 is carried out.

At the same time, the sliding member 170 slides with respect to the pivotal member 160 by the elastic member 180 while being sequentially engaged with the engagement portions 114 provided at the back surface of the display unit 110. When the display unit 110 is completely laid, support of the display unit 110 by the sliding member 170 is released.

During pivotal movement of the display unit 110 in the second pivotal direction W2, the display unit 110 pivots without interfering with the body 10 at the end thereof by virtue of the pivotal guide 130.

As apparent from the above description, in the image forming apparatus according to an embodiment, the pivotal structure thereof operates in linkage with operation of the display device and, as such, it may be possible to reduce the pivotal space of the display device. Thus, a redundant space may be secured, and miniaturization of the image forming apparatus may be possible.

Although a few embodiments have been shown and described, it would be appreciated by those skilled in the art that changes may be made in these embodiments without departing from the principles and spirit of the disclosure, the scope of which is defined in the claims and their equivalents.

What is claimed is:
1. An image forming apparatus comprising:
   a body;
   a printer disposed in the body and configured to form the image on the supplied printing medium;
   a printing medium supplier configured to supply a printing medium to an interior of the body, for formation of an image on the printing medium;
   a discharge unit configured to discharge the image-formed printing medium outwardly of the body;
   a display unit configured to be tiltable in a first pivotal direction with respect to the body, the display unit has a first position, at which the display unit is arranged in parallel with the body, and a second position, at which the display unit is positioned after pivoting from the first position in the first pivotal direction; and
   a support unit at a back surface of the display unit, to hold the display unit in a pivotal state,
   wherein the support unit comprises:
   a pivotal member configured to pivot about a pivot axis spaced apart from a tilting axis of the display unit and to pivot with respect to the body in a second pivotal direction opposite to the first pivotal direction in linkage with a tilting operation of the display unit, and
   a sliding member, disposed inside the pivotal member and slidable from the pivotal member contact and support a first back surface position of the back surface of the display unit at a tilting angle of the display unit and to contact and support a second back surface position of the back surface of the display unit at a second tilting angle of the display unit, wherein the display unit comprises a guide member provided at the back surface of the display unit, to enable the pivotal member to pivot in linkage with the tilting operation of the display unit, the guide member comprising a guide rail to guide a pivotal movement of the pivotal member, and the guide rail has a first guide position, at which the guide rail guides the pivotal member so that the display unit is positioned at the first position, and a second guide position, at which the guide rail guides the pivotal member pivoted in the second pivotal direction so that the display unit is positioned at the second position.

2. The image forming apparatus according to claim 1, wherein the guide rail has a curved shape having the first guide position and the second guide position at opposite ends thereof, respectively.

3. The image farming apparatus according to claim 1, wherein the second guide position is arranged nearer to a pivotal axis that is a pivot center of the pivotal member than the first guide position.

4. The image forming apparatus according to claim 1, wherein the pivotal member comprises a pivotal protrusion to move along the guide rail.

5. The image forming apparatus according to claim 1, wherein the support unit further comprises an elastic member to press the sliding member in order to enable the sliding member to support the back surface of the display unit while sliding with respect to the pivotal member.

6. The image forming apparatus according to claim 1, wherein the display unit comprises a plurality of engagement portions arranged in parallel with the back surface of the display unit, to be supported by the support unit.

7. The image forming apparatus according to claim 6, wherein:
   the display unit has a pivot center;
   the plurality of engagement portions comprise a first engagement portion and a second engagement portion, the second engagement portion arranged at a position farther from the pivot center of the display unit than the first engagement portion; and
   the sliding member varies a support position thereof from the first engagement portion to the second engagement portion when the display unit pivots in the first pivotal direction.

8. The image forming apparatus according to claim 6, wherein the plurality of engagement portions comprise a plurality of valleys and a plurality of mountains each formed between adjacent ones of the valleys.

9. The image forming apparatus according to claim 6, wherein the display unit further comprises a pivot guide provided at one side of the display unit, to prevent the display unit from interfering with the body during a tilting operation of the display unit in the first pivotal direction, the pivot guide comprising a pivot guide rail formed to be spaced apart from the pivot center in the first pivotal direction by a predetermined distance, and to be restrained by a pivot guide lug provided at the body.

10. An image forming apparatus comprising:
    a body;
    a printing medium supplier to supply a printing medium to an interior of the body;
    a printer to form an image on the supplied printing medium; and
    a discharge unit to discharge the image-formed printing medium outwardly of the body;
    a display unit disposed at one side of the body;

a first hinge unit provided at one side of the display unit, to enable the display unit to pivot in a first pivotal direction with respect to the body from a first position at which the display unit is arranged in parallel with the body to a second position; and a second hinge unit configured to pivot about a pivot axis spaced apart from a tilting axis of the display unit and to pivot in a second pivotal direction opposite to the first pivotal direction in linkage with an operation of the display unit, wherein the second hinge unit includes:

a pivotal member pivotally coupled to the body, to pivot in the second pivotal direction during pivoting of the display unit in the first pivotal direction, a sliding member, disposed inside the pivotable member and slidable from the pivotal member, configured to contact and support a first back surface position of a back surface of the display unit at a first tilting angle of the display unit and to contact and support a second back surface position of the back surface at a second tilting angle of the display unit, and a guide member provided at the back surface of the display unit, to enable the pivotal member to pivot in linkage with the tilting operation of the display unit, the guide member comprising a guide rail to guide a pivotal movement of the pivotal member, and the guide rail has a first guide position, at which the guide rail guides the pivotal member so that the display unit is positioned at the first position, and a second guide position, at which the guide rail guide the pivotal member pivoted in the second pivotal direction so that the display unit is positioned at the second position.

11. The image forming apparatus according to claim 10, wherein the second hinge unit further includes:

an elastic member to provide an elastic force to slide the sliding member.

12. The image forming apparatus according to claim 11, wherein:

the a guide rail guides the pivotal member such that the pivotal member pivots in the second pivotal direction when the display unit pivots in the first pivotal direction.

13. The image forming apparatus according to claim 12, wherein the guide rail has a curved shape inclined in a direction opposite to the first pivotal direction while extending in a longitudinal direction of the display unit from a pivot center of the display unit.

14. The image forming apparatus according to claim 12, wherein the pivotal member comprises a pivotal protrusion movable along the guide rail while being restrained by the guide rail.

15. The image forming apparatus according to claim 14, wherein:

at the first guide position, the pivotal protrusion is positioned so that the display unit is positioned at the first position, and at the second guide position, the pivotal protrusion is positioned so that the display unit is positioned at the second position; and the guide rail has a curved shape having the first guide position and the second guide position at opposite ends thereof, respectively.

16. The image forming apparatus according to claim 11, wherein the sliding member of the second hinge unit is pressed by the elastic member, to support the back surface of the display unit.

17. An image forming apparatus comprising:

a body;

a display unit disposed at one side of the body;

a first hinge unit provided at one side of the display unit; to enable the display unit to pivot in a first pivotal direction with respect to the body from a first position at which the display unit is arranged in parallel with the body to a second position; and a second hinge unit configured to pivot about a pivot axis spaced apart from a tilting axis of the display unit and to support a back surface of the display unit such that the display unit is maintained at a predetermined tilting angle by supporting a different position of the back surface of the display unit according to a tilting angle of the display unit, wherein the first hinge unit and the second hinge unit are linked to a tilting operation of the display unit, and the second hinge unit includes:

a pivotal member pivotally coupled to the body, to pivot in the second pivotal direction during pivoting of the display unit in the first pivotal direction, a sliding member, disposed inside the pivotable member and slidable from the pivotal member, configured to contact and support a first back surface position of the back surface at a first tilting angle of the display unit and to contact and support a second back surface position of the back surface at a second tilting angle of the display unit, and a guide member provided at the back surface of the display unit, to enable the pivotal member to pivot in linkage with the tilting operation of the display unit, the guide member comprising a guide rail to guide a pivotal movement of the pivotal member, and the guide rail has a first guide position, at which the guide rail guides the pivotal member so that the display unit is positioned at the first position, and a second guide position, at which the guide rail guides the pivotal member pivoted in the second pivotal direction so that the display unit is positioned at the second position.

* * * * *

UNITED STATES PATENT AND TRADEMARK OFFICE
CERTIFICATE OF CORRECTION

PATENT NO. : 10,021,258 B2
APPLICATION NO. : 14/491167
DATED : July 10, 2018
INVENTOR(S) : Sae Hoon Han et al.

Page 1 of 1

It is certified that error appears in the above-identified patent and that said Letters Patent is hereby corrected as shown below:

In the Claims

In Column 9, Lines 40-44, Claim 1, delete "a printer disposed in the body and configured to form the image on the supplied printing medium; a printing medium supplier configured to supply a printing medium to an interior of the body, for formation of an image on the printing medium;" and insert -- a printing medium supplier configured to supply a printing medium to an interior of the body, for formation of an image on the printing medium; a printer disposed in the body and configured to form the image on the supplied printing medium; --, therefor.

In Column 9, Line 48, Claim 1, delete "has" and insert -- having --, therefor.

In Column 9, Line 53, Claim 1, delete "unit," and insert -- unit --, therefor.

In Column 9, Line 62, Claim 1, delete "member" and insert -- member, configured to --, therefor.

In Column 9, Line 64, Claim 1, after "a" insert -- first --.

In Column 10, Line 17 approx., Claim 3, delete "farming" and insert -- forming --, therefor.

In Column 11, Line 31 approx., Claim 10, delete "guide" and insert -- guides --, therefor. (Second Occurrence)

In Column 11, Line 41, Claim 12, after "the" delete "a".

In Column 12, Line 17 approx., Claim 17, delete "unit;" and insert -- unit, --, therefor. (Second Occurrence)

Signed and Sealed this
Twenty-second Day of January, 2019

Andrei Iancu
*Director of the United States Patent and Trademark Office*